United States Patent [19]

Lutzmann et al.

[11] 4,096,013

[45] * Jun. 20, 1978

[54] METHOD OF BONDING SHEETS IN AIR BY ALTERNATING CURRENT CORONA DISCHARGE AND APPARATUS FOR SAME

[75] Inventors: H. Harald Lutzmann, Cleveland Heights, Ohio; Paul D. Frayer, Hattiesburg, Miss.

[73] Assignee: National Can Corporation, Chicago, Ill.

[ * ] Notice: The portion of the term of this patent subsequent to Jul. 9, 1991, has been disclaimed.

[21] Appl. No.: 692,195

[22] Filed: Jun. 2, 1976

Related U.S. Application Data

[63] Continuation of Ser. No. 449,242, Mar. 8, 1974, abandoned, which is a continuation-in-part of Ser. No. 259,112, Jun. 2, 1972, Pat. No. 3,823,061, which is a continuation-in-part of Ser. No. 152,436, Jun. 11, 1971, abandoned.

[51] Int. Cl.² .................. B29C 27/04; B32B 31/12
[52] U.S. Cl. .................. 156/272; 156/244.17; 156/306; 156/380; 428/420; 428/461; 428/520
[58] Field of Search .............. 156/272, 275, 306, 274, 156/244, 380; 427/40, 41; 428/420, 461, 474, 480, 520, 513; 204/165, 168, 169

[56] References Cited

U.S. PATENT DOCUMENTS

| | | | |
|---|---|---|---|
| 2,864,755 | 12/1958 | Rothacker | 156/272 |
| 3,081,214 | 3/1963 | Strome | 156/272 |
| 3,196,063 | 7/1965 | Paquin et al. | 156/244 |
| 3,281,347 | 10/1966 | Winder | 156/272 |
| 3,323,965 | 6/1967 | Hanle et al. | 156/244 |
| 3,360,412 | 12/1967 | James | 156/229 |
| 3,371,002 | 2/1968 | Reddeman | 156/244 |
| 3,415,683 | 12/1968 | Coffman et al. | 427/40 |
| 3,426,102 | 2/1969 | Solak et al. | 260/879 |
| 3,453,173 | 7/1969 | Isley et al. | 428/424 |
| 3,498,865 | 3/1970 | Paquin et al. | 156/244 |
| 3,579,395 | 5/1971 | Rath | 156/94 |
| 3,823,061 | 7/1974 | Frayer et al. | 428/516 |

OTHER PUBLICATIONS

Evans & Goring, Journal of Applied Polymer Science, vol. 5, pp. 1365–1375 (1971), "Corona Induced Autohesion of Polyethylene".

*Primary Examiner*—William J. Van Balen

[57] ABSTRACT

Two or more chemically dissimilar and non-compatible films may be bonded together to form a composite sheet by simultaneously subjecting them to high voltage electric corona discharge of selected intensity continuously through a critical region of mutual contact of the films. The critical region begins at the point at which the film surfaces to be bonded are not in contact with one another and extends at least to the point where all the films to be bonded are in mutual contact with their adjacent films.

A preferred film suitable for use as a wrapping material and obtained by the process of the invention comprises at least one layer of a polyolefin film and at least one layer of a film containing an acrylonitrile polymer.

10 Claims, 12 Drawing Figures

METHOD OF BONDING SHEETS IN AIR BY ALTERNATING CURRENT CORONA DISCHARGE AND APPARATUS FOR SAME

This application is a continuation of application Ser. No. 449,242 filed Mar. 8, 1974, now abandoned and which is a continuation-in-part application of our earlier-filed application Ser. No. 259,112, filed Jun. 2, 1972, now U.S. Pat. No. 3,823,061, which in turn is a continuation-in-part of our application Ser. No. 152,436, filed Jun. 11, 1971, now abandoned, both latter applications entitled "Composite Barrier Film and Method of Making the Same."

The present invention relates to a method of making composite sheets by laminating two or more films together and to composite sheets obtained by such method. More particularly, the present invention relates to a method of bonding together layers of chemically dissimilar and non-compatible plastic films, plastic films and metal foils, and plastic films and paper and other fiber sheets by means of high voltage electric corona discharge treatment, and to composite sheets made by such method. Although the invention is applicable to composite sheets in general, it has particular applicability to a laminated plastic sheet with excellent barrier properties, which is suitable for use as a packaging material for food, cosmetics and other products which are susceptible to attack or deterioration by moisture or oxygen.

A great variety of plastic films exist, each of which has widely differing properties of flexibility, impact strength, adhesion, permeability to moisture and gases, etc. It is often desired to obtain a sheet which combines the different properties of different films in a single material, and this is accomplished by laminating two or more films, foils and/or sheets into a single, composite sheet of material. To select a simple example, nylon films have advantageous properties of high strength, toughness and clarity. However, they have inadequate adhesion or sealability characteristics, which limits their usefulness for packaging and similar applications. Accordingly, it is known to laminate a polyethylene film to a nylon film to form a polyethylene-nylon composite sheet. The polyethylene side of the sheet has excellent sealability characteristics. Lamination of two or more films may be desired to add stiffness to the finished composite to enable it to be handled by automatic wrapping machines, to increase impact and tear resistance, etc.

Similarly, it is often desired to laminate a sheet of metal foil, usually aluminum foil, to a plastic film to form a foil-plastic film composite, and to laminate a plastic film to paper or other fiber sheet.

The method by which the lamination of two or more chemically dissimilar and non-compatible films may be accomplished depends upon the adhesion characteristics of the films. (As used herein, "film" may refer to plastic, metal foil, paper or other fiber material, except where otherwise specified. Plastic, as used herein, refers to organic polymeric materials, e.g., polyethylene, polypropylene, etc.) By "non-compatible," as the term is used in the specification and claims, it is meant that the two films will not bond with any significant strength one to the other without an adhesive layer between them, even if one or both are heated to or beyond the point of softening and the films are then brought into contact under pressure. Conversely, dissimilar films which are "compatible" are those which, upon such heating and contact, will be bonded with significant strength one to the other.

Obviously, two plastic films of identical chemical composition will always be compatible since their softened surfaces are miscible, i.e., upon contact the softened surfaces will tend to "dissolve" in each other so that a strong bond is formed between them upon hardening. Accordingly, when two films are "non-compatible" they are necessarily chemically dissimilar. Some chemically dissimilar films are, of course, compatible.

As will be appreciated, compatibility as defined herein is a relative term, and films which bond to one another but slightly or not at all, i.e., are non-compatible or only slightly compatible, will form much stronger bonds as a result of treatment in accordance with the invention.

In order to bond two non-compatible films together, the prior art usually requires that an intermediate adhesion layer be provided between them, consisting of a coating of adhesive, or of one or more films, which will adhere to, i.e., are compatible with, one or both of the films to be laminated. For example, if a laminated sheet of film A and film B is sought, but film A will not adhere with sufficient strength to film B, a third film C, which will adhere to both A and B although A and B will not adhere to each other, may be interposed between A and B to serve as an intermediate adhesion film layer. There are obvious disadvantages to proceeding in this manner. The provision of an adhesive or of an adhesive film layer increases the cost of the finished product and the adhesive or adhesive film layer may have undesirable properties, such as undue stiffness or opacity.

It is well known to treat individual films of plastic material, particularly polyolefins, as aforesaid, either chemically, by flame, or by electric corona discharge to enhance the bonding characteristics of the surface so that the polyolefin film will better accept printing inks and other coating or printing materials. See, for example, U.S. Pat. Nos. 2,910,723 and 2,859,481.

It is also known to treat polyvinyl butyral plastic sheeting by electric discharge in a nitrogen atmosphere, to reduce the tendency of the polyvinyl butyral sheeting to adhere to itself under pressure, as when stored in a roll. (See U.S. Pat. No. 3,407,130)

It is also known to utilize an electric corona discharge to generate ions which impinge on a plastic film to develop an electrostatic change thereon at the region where the plastic film (polyethylene) contacts a paper sheet to which it is to be bonded. The electrostatic charge forms an attractive field between the plastic and the paper to temporarily force them into bonding contact. (See U.S. Pat. No. 3,498,865) Preferably, the corona discharge itself does not contact the polyethylene. Various electrode structures to carry out the process are disclosed in an earlier patent, U.S. Pat. No. 3,196,063, mentioned in the U.S. Pat. No. 3,498,865.

For purposes of bonding two or more dissimilar films together, it is known to treat freshly extruded films with an activating gas such as ozone, particularly when one film is a substantially non-polar material such as polyethylene, or when the film pair is one that will normally not bond, e.g., polyethylene-nylon. (See U.S. Pat. No. 3,339,234)

It is also known to treat by electric corona discharge only one of two dissimilar films which are to be bonded together. (See U.S. Pat. No. 3,081,214).

U.S. Pat. No. 3,453,173, which deals with laminating a polyolefin film to an acrylonitrile polymer film by extruding polyolefin in the molten state onto acrylonitrile polymer film which has previously been treated with an adhesive, states in passing (column 3, lines 12-17) that ". . . the surfaces of either or both of the acrylonitrile polymer films and the polyolefin film can also be flame treated, treated by corona discharge, . . . " This patent therefore shows awareness of utilizing corona discharge treatment in general to enhance adhesive bonding.

Electrical treatment of individual plastic films for subsequent application of printing inks or other compounds thereto, or for temporarily holding them in bonding contact with another film or for preventing adhesion of sheet material to itself, is not to be confused with the present invention which provides for the treatment of two or more dissimilar and non-compatible films in order to change their chemical characteristics so that they will bond together in a permanent bond, whereas they would not so bond prior to such treatment.

Thus, the prior art shows at least a general awareness of the utilization of electric corona discharge treatment in connection with bonding two or more dissimilar plastic films into a composite sheet. However, the prior art is deficient in several significant respects.

Firstly, the prior art fails to show an awareness of the relationship between the intensity of electric corona discharge treatment and the bonding power imparted to the film thereby. In this respect, it has been discovered as set forth in some detail in my aforesaid U.S. Pat. No. 3,823,061, that there exists an optimum range of intensity of electrical corona discharge treatment for each specific film pair to obtain the maximum bonding strength therebetween. (The intensity of treatment is a function of the total power input to the treating electrodes and the time of exposure of the film to the corona discharge.)

Secondly, and most significantly, the prior art fails to show an awareness of the need to maintain corona discharge treatment throughout a certain critical region as described hereinbelow, in order to attain satisfactory bonding.

In attempting to apply to a commercial production unit the discovery, verified on bench scale and pilot plant equipment, that under-treatment and over-treatment must be avoided if the strongest possible bond is desired, certain difficulties were encountered.

As a practical matter, it was found that at modern production speeds, commercially available corona discharge power units are usually not capable of over-treatment of the films because the high speed of film travel results in very short residence times of the films in the corona discharge. However, under-treatment can, and does, result causing unsatisfactorily weak bonding of the films.

On most commercial units for thin films (up to about 10 mils in thickness) film travel speed is between about 60 to 150 feet per minute. On units handling thicker sheets (10 mils or over) sheet travel is between about 10 to 60 feet per minute.

At these speeds, the film passes through the corona discharge region in a matter of milli-seconds, and insufficient treatment results.

In accordance with the present invention, two or more non-compatible films have their surfaces simultaneously subjected to a high voltage, electrical corona discharge treatment continuously through a region (hereinafter in this specification sometimes referred to as the "critical region") extending from a point at which the film surfaces to be bonded are not in contact with each other to (and preferably, somewhat beyond) a point where the films are brought into surface-to-surface contact with each other. The contacting pressure required is very slight, merely touch contacting sufficing. Thus, the contact pressure imposed by drawing the films together over a roller is more than sufficient.

The electrical corona discharge is visible on both sides of at least the upper layer or layers of film and presumably extends through all the film layers. Since, in practice, the lowermost layer of film lies flat against a grounded supporting surface, it is not possible to observe the glow of the corona discharge on the contact or supported side of the lowermost film layer.

In accordance with a preferred aspect of the invention, at least one of the films is a plastic film, i.e., an organic polymer film. In accordance with another aspect of the invention, all the films to be treated and bonded are plastic films.

The process of the present invention, by providing continuous electric corona discharge treatment through the critical region simultaneously to both or all films, as more fully described hereinbelow, provides strong bonding between dissimilar films (including polyolefin and acrylonitrile polymer films) without the need for adhesives, molten extrusion of one film on to the other, or any other of the prior art expedients.

A convenient method of providing a corona discharge over the film surface is to utilize an extended electrode positioned with its longitudinal axis adjacent to an electrically grounded film support member. The corona is formed between the electrode and the grounded film support member, which together form an electrode pair, and penetrates all the film layers. When the film support member is a grounded roller, the electrode is conveniently positioned with its longitudinal axis substantially parallel to the axis of rotation of the roller. However, a difficulty encountered in practice with this otherwise highly satisfactory technique was that the laminated film composite would tend to stick to the roller.

In accordance with another aspect of the invention, it has been found that the problem of film sticking to the roller or other support member surface is overcome by insuring that the corona discharge (which, as aforesaid, penetrates all the layers of film) does not extend to any portion of the base film which is not in surface to surface contact with the roller or other grounded support. By "base film" is meant the one film layer which comes into direct contact with the grounded roller or other support.

By exposing the base film layer to electric corona discharge only after it is already in contact with an electrically grounded support, it is believed that development of an attractive electric charge field between the base film layer and the grounded support, which would cause sticking of the film, is precluded.

Thus, in accordance with a preferred aspect of the invention, the electrical corona discharge extends to only those portions of the base film layer which are in contact with an electrically grounded member.

The corona discharge is preferably imposed over the entirety of the treated films when it is desired to adhere the entire width of the films one to the other. In such cases, the electrode and the electrically grounded support member preferably are at least coextensive with the width of the web of film layers passing therebetween, i.e., both the electrode and the film support member are at least as long as the web of films passing therebetween is wide. As a practical matter in such cases, the electrode and the film support are preferably longer than the width of the film web passing therebetween.

In some cases, however, the edges of the films being joined are not to be adhered to each other. An example of this occurs when the edges of the film are to be trimmed after the films are joined, and the different films in the trim scrap are to be separated. In such cases an electrode which is shorter than the film web is wide is employed, so that the edges of the film are untreated.

An important property of packaging films for commodities such as foodstuffs and cosmetics is their effectiveness in providing a barrier between the commodity and the moisture, oxygen and other gases in the air. Certain plastic films form better barriers in respect of certain of these gases than do others. Olefinic nitrile polymer films are relatively permeable to moisture but impermeable to oxygen, carbon dioxide and nitrogen. Polyolefin films are excellent moisture barriers but are quite permeable to oxygen, carbon dioxide and nitrogen. A laminated packaging material comprising a layer of olefinic nitrile polymer and a layer of polyolefin polymer would accordingly have highly desirable barrier characteristics.

Polyolefin and olefinic nitrile polymer films however, cannot be bonded together in accordance with the prior art teachings except with the provision of at least an intermediate adhesion film layer. (U.S. Pat. No. 3,453,173, mentioned above, requires an adhesion film layer plus molten deposition of the polyolefin to bond it to an acryolonitrile film)

In accordance with one aspect of the invention, therefore, a laminated sheet of polyolefin and olefinic nitrile polymer film is provided by subjecting polyolefin and olefinic nitrile polymer film to simultaneous corona discharge treatment through the critical region and contacting the treated films to form a laminated sheet in accordance with the invention. No adhesives or molten extrusion coating is required.

In accordance with other aspects of the invention, combinations of non-compatible plastic films, and of plastic films with metal foils, which are believed not to have heretofore been bondable without adhesives or extrusion coating, have been successfully bonded, as follows: polyolefins (e.g. polyethylene and polypropylene and their co-polymers) with polyamides, (e.g. nylon) and with polyesters (e.g., polyterephthalates); polyolefins with rubberized olefinic nitrile - olefinic ester polymers (e.g., of the type disclosed in Solak U.S. Pat. No. 3,426,102); and polyethylene with aluminum foil. A specific polyamide (reaction product of diamines and dicarboxylic acids) film useful in the present invention is nylon-6. Polyester films useful in the present invention include polytetramethylene terephthalate and polyethylene terephthalate.

Olefinic nitrile-copolymer resins are available under the tradenames BAREX (Vistron Corporation, a subsidiary of the Standard Oil Company), LOPAC (Monsanto Chemical Company), XT-ACRYLIC MULTI POLYMER (American Cyanamid Company) and CYCOPAC (Marbon Chemical Division of Borg-Warner Corporation). Films made from these resins are subsequently referred to herein simply by the resin tradenames, i.e., BAREX, LOPAC, XT-AMP, and CYCOPAC. The BAREX films referred to in the examples are rubberized BAREX films as disclosed in the abovementioned U.S. Pat. No. 3,426,102. An olefinic nitrile content of at least fifty percent (50%) by weight in the olefinic nitrile-copolymer film is preferred, and is contained in each of the above-mentioned films. For example, at least fifty percent (50%) by weight acrylonitrile or substituted acrylonitrile in the olefinic nitrile-copolymer film to be laminated to the polyolefin film is preferred.

As hereinabove stated, it is often desirable to laminate two, three, or more plastic films into a single laminated plastic sheet. In accordance with another aspect of the invention, therefore, two or more plastic films may be treated simultaneously by a single electrode pair to provide the necessary bonding characteristics.

It has been further found that electrical corona discharge treatment of films at elevated temperatures is more effective in enhancing bonding strength than treatment of the same films at ambient, or lower, temperatures. In other words, a less intense electrostatic discharge treatment will impart the same adhesion properties to film treated at a higher temperature than to film treated at a lower temperature. In accordance with another aspect of the invention, therefore, two or more films are treated by electrical corona discharge at a controlled, elevated temperature to enhance and standardize the bonding strength imparted at a given electrical power setting.

The film to be treated may be previously made plastic film which is advantageously heated to an elevated temperature close to its softening point prior to the corona discharge treatment. Alternatively, and preferably, the film to be treated is plastic film newly made from the molten state and subjected to the corona discharge treatment while still at an elevated temperature before it has had an opportunity to cool to much below its softening temperature from the temperature at which it was extruded, cast or blown. A laminated sheet may also be made in accordance with the invention from a newly extruded plastic film and a previously manufactured film, both of which are subjected to corona discharge treatment.

It is therefore an object of the invention to provide a method of bonding two or more dissimilar films, at least one of which is a plastic film, to each other by treating the films with high voltage corona discharge continuously through a critical region and bringing the treated films together to form a laminated composite sheet of two or more films.

It is another object of the present invention to provide a method for simultaneously treating a multiplicity, i.e., two or more plastic films, in like manner to form a multi-layered composite sheet.

It is yet another object of the invention to provide a method of providing corona discharge treatment to a plurality of plastic films by means of a single electrode pair.

It is yet another object of the invention to provide laminated film composite sheets which are free of intermediate adhesive or adhesion film layers, including an acrylonitrile film — polyolefin film composite, a polyamide film — polyolefin film composite, a polyolefin film — polyester film composite and a polyolefin film — metal foil composite.

Other objects and advantages of the invention will become apparent from the following detailed description. The invention may take form in certain parts and arrangements of parts, preferred embodiments of which are described in detail in the specification and in the accompanying drawings, wherein.

As hereinabove stated, electrical corona discharge treatment has an effect on the nature of the film surfaces. While the precise nature of the change which takes place on the surface of the treated film is not known with certainty, numerous theories have been advanced concerning the effect of the treatment on the chemical structure and crosslinking of the surface molecules of the plastic film. However, the degree of the change undergone by the film surface may be determined by simply measuring the wettability of the surface by a standard liquid. This is accomplished by measuring the characteristic contact angle formed between a standard liquid and the surface of the film both before and after treatment. The intensity of treatment may therefore be expressed in terms of contact angle between the film and the standard liquid. Any suitable test liquid may be employed. For example, for polyethylene film, a formamide-cellosolve liquid may be employed, or ordinary distilled water may be used. The test liquid is simply applied with a swab to a small area of the film, and the angle of contact between the film and the droplets of liquid is measured by any convenient means.

Figure 1:
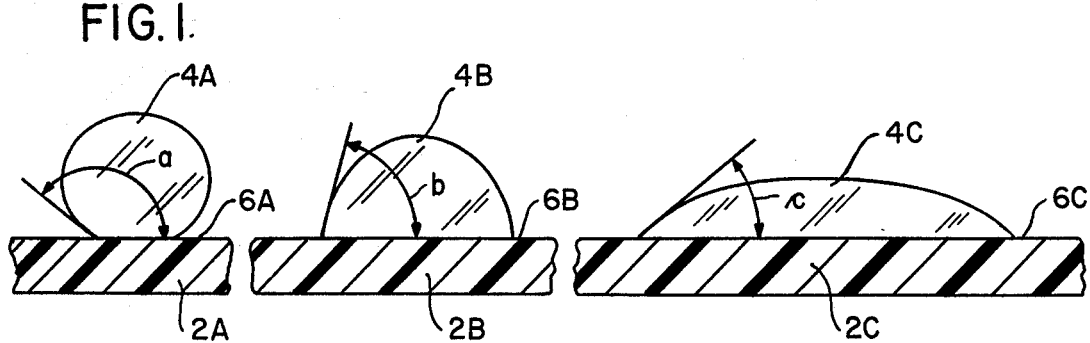
FIG. 1 shows a schematic cross section of three sections of film, each containing a drop of liquid thereon.

Referring now to FIG. 1, there is shown in diagrammatic enlarged cross sectional view three sections of film material 2A, 2B, 2C. On the surface of each respective segment of film is shown a drop of liquid indicated, respectively, 4A, 4B and 4C. The contact angle between a line tangent to the drop of liquid at the point it contacts the film surface and the surface of the film is shown, respectively, as the angles $a$, $b$ and $c$. Contact angle $a$ is an obtuse angle and shows that the film surface 6a is relatively non-wettable, i.e., the liquid drops tend to ball up to a small area of contact between liquid and film, relative to the volume of the drop 4A. The contact angle $b$ shows that the film surface 6b is relatively more wettable than the surface 6a, but less wettable than the surface 6c, contact angle $c$ being the smallest of the three angles $a$, $b$ and $c$. Increased electric corona discharge treatment in accordance with the invention tends to increase the wettability of the surface, and decrease the contact angle. (Of course, increased wettability does not necessarily increase adhesion strength. With some organic polymeric films, corona discharge treatment may actually decrease adhesion properties. See U.S. Pat. No. 3,407,130, referred to above.) Accordingly, the degree of treatment of a given film is conveniently measured and referred to in terms of the measure, in degrees, of its contact angle with a drop of standard liquid.

The required degree of bonding between the films of a laminate sheet may vary depending on the application in which the sheet is to be employed. Generally, a peel strength of 400 grams or more is satisfactory for a permanent bond. In some cases, as when it is desired to separate the trim scrap of a laminate into its component films for re-processing the scrap, a lower peel strength is desired. The peel strength is the force in grams required to separate a one-inch wide strip of one film from the other at room temperature. All references in the specification and claims to a peel strength in grams are based on a 1-inch wide strip of laminated sheet, tested at room temperature (72° F).

In the following Examples I, II and III, electrical corona discharge treatment of intensity sufficient to engender the contact angle changes indicated was applied by passing a sample piece of film through the corona discharge at 64° C.

The film was then heated to 120° C and contacted at a contact pressure of one pound per square inch. A brief pressure - contact time, less than one second, was sufficient to attain final adhesion strength. Extending the pressure-contact time to thirty seconds did not increase the final adhesion strength. Contact angles are with distilled water. In each case, contact angles decrease with increasing intensity of treatment.

EXAMPLE I

XT-AMP, Polypropylene

|  | Contact Angle (Water), degrees | | |
|---|---|---|---|
| Polypropylene Film | 92* | 92* | 50 |
| XT-AMP Film | 63* | 45 | 45 |
| Peel Strength, grams | 11.1 | 5.5 | 379 |

EXAMPLE II

Acrylonitrile - Butadiene - Styrene Copolymer (Marbon Cycopac) Polypropylene

|  | Contact Angle (Water), degrees | | |
|---|---|---|---|
| Polypropylene Film | 92* | 92* | 50 |
| ABS Film | 65* | 35 | 35 |
| Peel Strength, grams | 8.1 | 8.1 | 560 |

EXAMPLE III

LOPAC, Polypropylene

|  | Contact Angle (Water), degrees | | |
|---|---|---|---|
| Polypropylene Film | 92* | 92* | 50 |
| LOPAC Film | 65* | 35 | 35 |
| Peel Strength, grams | 9.3 | 13.3 | 467 |

*Untreated Film.

Example IV, following, shows the result of treating polypropylene film with varying degrees of intensity of electric corona discharge treatment and applying the film to an untreated BAREX film. The degree or intensity of the treatment of the polypropylene film is measured in terms of the contact angle of distilled water on the polypropylene. The untreated BAREX film displays a contact angle at 65° with distilled water. Example IV shows that a quite narrow optimum range of treatment exists in which a peel strength over 400 grams is attainable.

Examples V, VI, VII and VIII show the peel strength obtained by laminating treated polypropylene and treated BAREX. (Unless otherwise specified in this specification and claims, the terms "treated" and "untreated" mean surface treatment by electric corona discharge treatment in accordance with the invention)

EXAMPLE IV

Untreated BAREX, Treated Polypropylene

|  | Contact Angle (Water), degrees | | | | | | |
|---|---|---|---|---|---|---|---|
| Polypropylene Film | 45 | 48 | 49 | 50 | 57 | 65 | 92 |
| BAREX Film (Untreated) | 65 | 65 | 65 | 65 | 65 | 65 | 65 |
| Peel Strength, grams | 480 | 520 | 250 | 60 | 90 | 160 | 0 |

EXAMPLE V

Treated BAREX, Treated Polypropylene

|  | Contact Angle (Water), degrees | | | | | |
|---|---|---|---|---|---|---|
| Polypropylene film | 45 | 48 | 49 | 57 | 65 | 92 |
| BAREX Film | 50 | 50 | 50 | 50 | 50 | 50 |
| Peel Strength, grams | 140 | 290 | 90 | 90 | 90 | 0 |

EXAMPLE VI

Treated BAREX, Treated Polypropylene

|  | Contact Angle (Water), degrees | | | | | |
|---|---|---|---|---|---|---|
| Polypropylene film | 45 | 48 | 51 | 57 | 65 | 92 |
| BAREX Film | 40 | 40 | 40 | 40 | 40 | 40 |
| Peel Strength, grams | 200 | 390 | 350 | 170 | 200 | 0 |

EXAMPLE VII

Treated BAREX, Treated Polypropylene

|  | Contact Angle (Water), degrees | | | | | | |
|---|---|---|---|---|---|---|---|
| Polypropylene film | 45 | 48 | 50 | 51 | 55 | 65 | 92 |
| BAREX Film | 39 | 39 | 39 | 39 | 39 | 39 | 39 |
| Peel Strength, grams | 450 | 720 | 550 | 480 | 400 | 10 | 0 |

EXAMPLE VIII

Treated BAREX, Treated Polypropylene

|  | Contact Angle (Water), degrees | | | |
|---|---|---|---|---|
| Polypropylene Film | 45 | 48 | 65 | 92 |
| BAREX Film | 38 | 38 | 38 | 38 |
| Peel Strength, grams | 130 | 480 | 40 | 0 |

Analysis of the data of examples V through VIII gives the following results.

| | Contact Angle (Water), degrees | |
|---|---|---|
| Minimum Peel Strength, grams | Polypropylene | Rubberized Acrylonitrile-Olefinic Ester Copolymer |
| 200 grams | 40 – 60 | 38 – 50 |
| 400 grams | 45 – 55 | 38 – 40 |

Similar testing of treated polyethylene and treated BAREX films gives the following results.

| | Contact Angle (Water), degrees | |
|---|---|---|
| Minimum Peel Strength | Polyethylene | Rubberized Acrylonitrile-Olefinic Ester Copolymer |
| 200 grams | 10 – 60 | 38 – 64 |
| 400 grams | 10 – 55 | 38 – 64 |

Figure 2:
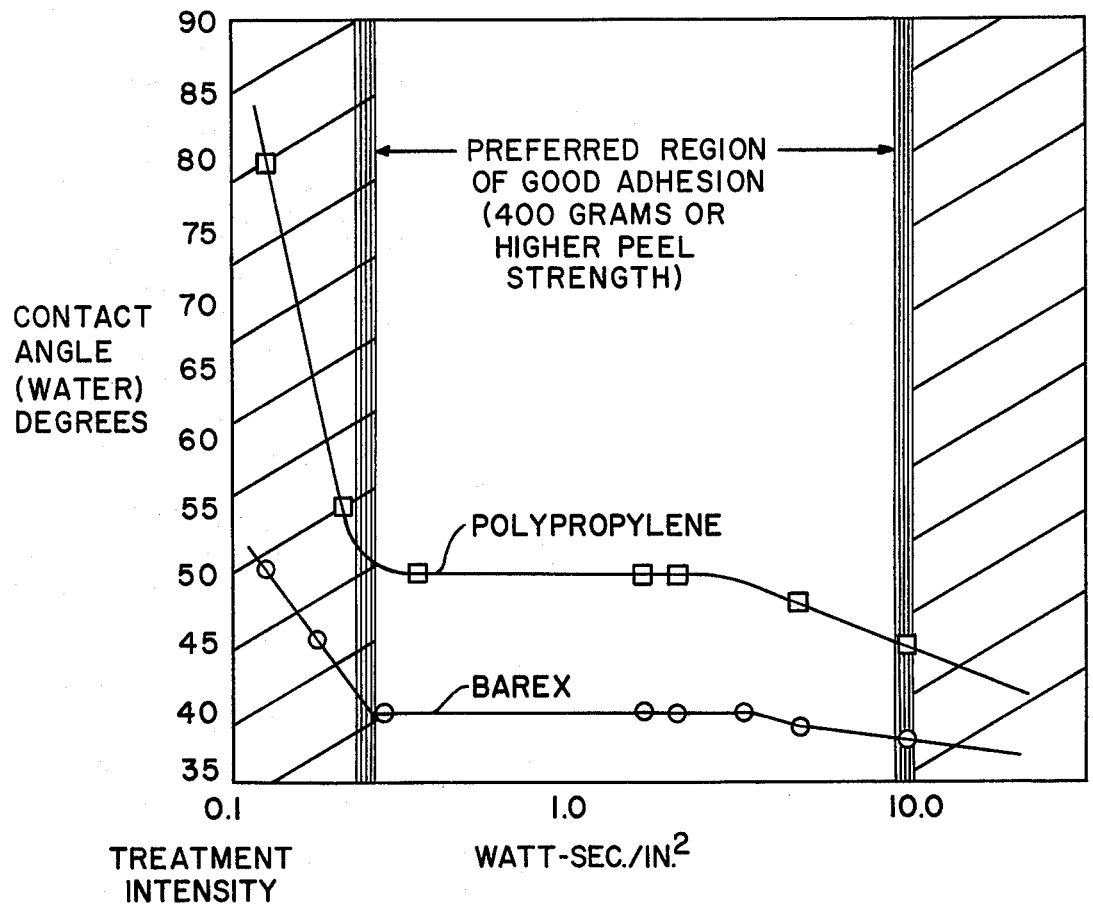
FIG. 2 is a graph which plots the contact angle of water on a plastic film against the electric corona discharge treatment in watt/seconds per square inch to which the film has been subjected; values are shown for polypropylene film and for BAREX film.

The effect of under or overtreatment is clearly shown in FIG. 2, in which the contact angle in degrees with distilled water of the treated film is plotted against the relative degree of treatment, which is shown on the ordinate of the graph in watt-seconds of per square inch of treated film. It is shown that a degree of treatment between about 0.3 and 10.0 watt-second per square inch for both films results in a laminate between the polypropylene and BAREX films which had good adhesion properties i.e., peel strength of over 400 grams. Undertreatment or overtreatment of either or both the films as indicated by the graph results in poor adhesion, i.e., a peel strength of below 400 grams. Naturally, many other combinations of intensity of treatment of the films (they need not be treated with equal intensity) will result in good adhesion.

Examples IX through XVII following give the results of tests of laminated composite sheets made on pilot plant equipment utilizing as the electric corona discharge power unit an electric generator capable of supplying up to 50 milliamps at 10,000 volts. Voltage and current into the corona discharge electrode may be varied between 10 and 50 milliamps and between 4,500 to 10,000 volts. The generator used was manufactured by Pillar Corporation of West Allis, Wisconsin.

In all cases a zero value given under the heading "Treatment Intensity, Watt-Sec per Square Inch" means that no electric corona discharge treatment was employed. A peel strength of zero given under the heading "Peel Strength, Grams per Inch," means that the two materials did not bond together at all. A peel strength expressed as greater than (">") a given value, means that at that value of peeling force, one of the films failed, but the bond between the two films did not.

In each of the following examples, the newly made polyethylene film is made from type 30222 resin sold by the Chemplex Company, the newly made polypropylene coating is made from type 7620 or 9620 resin sold by Diamond Shamrock, and the temperatures given for the newly made films is that measured at the outlet slit of the extrusion die used.

In all cases, a nine and one-half inch wide laminated sheet was prepared by running the film at six feet per minute and subjecting it to the intensity of treatment specified. Treatment intensity is calculated as shown in the following sample calculations, which corresponds to the first datum* given in Example IX below.

Data
Electric treater output voltage: 4,170 volts.
Electric treater output current: 2.4 milliamps.
Film width: 9½ inches.
Film travel speed: 6 ft/min = 1.2 in./sec.
Calculations Film area treated per unit time = $1.2 \frac{in.}{sec.} \times 9.5 \, in. = 11.4 \frac{in.^2}{sec.}$ Wattage output = 4,170 volts × 2.4 milliamps = 5 watts Treatment intensity = $\frac{5 \, watts}{11.4 \frac{in^2}{sec}} = 0.44 \frac{watt\text{-}sec.}{in^2}$

EXAMPLE IX

| | Treatment Intensity Watt-sec per in² | Laminate Peel Strength Grams per inch |
|---|---|---|
| A film of | 0 | 0 |
| 10 mil thick nylon-6 | 0.44* | 200 |
| (sold under the trade- | | |
| mark CAPRAN by Allied Chemical | 1.23 | 800 |
| Company) with 1.5 mil thick | 3.16 | >1,200 |
| polyethylene film | 5.66 | >1,200 |
| extruded at 400° F. | | |

EXAMPLE X

| | | |
|---|---|---|
| Newly made 1.5 mil | 0 | 0 |
| thick nylon-6 film (made | 2.64 | 650 |
| from Plaskon resins) sold | 3.50 | >1,200 |
| by Allied Chemical Company | | |
| with 1.5 mil polyethylene | | |
| film, both extruded at 400° F. | | |

EXAMPLE XI

| | Treatment Intensity Watt-sec per in² | Laminate Peel Strength Grams per inch |
|---|---|---|
| Film of 2 mil | 0 | 0 |
| thick biaxially oriented | 0.29 | 0 |
| polyester film (sold under | 1.31 | 0 |
| the trademark HOSTAPHAN, by | 3.29 | 200 |
| Kalle Aktiengesellschaft, | 7.10 | 400 |
| Wiesbaden-Biebrich, Germany, | | |
| Type E 5298E) with 1.5 mil | | |
| thick polyethylene film ex- | | |
| truded at 400° F. | | |

EXAMPLE XII

| | | |
|---|---|---|
| Newly made 1.5 mil | 0 | 0 |
| polyterephthalate film | 3.16 | >1,200 |
| with 1.5 mil polyethylene | | |
| films, both extruded at | | |
| 450° F. | | |

EXAMPLE XIII

| | | |
|---|---|---|
| Film of one mil | 0.29 | 0 |
| thick rubberized olefinic | 1.31 | 50 |
| nitrile polyolefin film (made | 3.29 | 50 |
| from a resin sold under the | 8.35 | 500 |
| tradename BAREX 210 by the | | |
| Vistron Corporation, a | | |
| subsidiary of the Standard | | |
| Oil Company (with 1.5 mil | | |
| polyethylene film extruded | | |
| at 400° F. | | |

EXAMPLE XIV

| | | |
|---|---|---|
| Newly made 1.0 mil thick | 0 | 0 |
| BAREX film (as in Example XIII) | 1.31 | 400 |
| with 1.5 mil thick polyethylene | 4.20 | >1,200 |
| extruded at 400° F. | | |

EXAMPLE XV

| | | |
|---|---|---|
| Newly made 1.5 mil | 0 | 0 |
| thick 1, polytetramethylene | 3.16 | 50 |
| terephthalate (sold under the | 10.50 | >1,000 |
| Tradename polyterephthlate | | |
| by Eastman Kodak, and 1.5 mil | | |
| polypropylene, both extruded | | |
| at 400° F. | | |

EXAMPLE XVI

| | Treatment Intensity Watt-sec per in | Laminate Peel Strength Grams per inch |
|---|---|---|
| Film of | 2.63 | 5-10 |
| 7.5 mil thick polyethylene | 5.25 | 150-175 |
| terephthalate film (sold | 7.90 | 1,000 |
| under tradename MYLAR by | | |
| DuPont Chemical Co.) with | | |
| 1.5 mil thick polypropylene | | |
| extruded at 380° F. | | |

EXAMPLE XVII

| | | |
|---|---|---|
| Film of 10 mil | 0 | 0 |
| thick nylon-6 film (same as | 5.27 | 0 |
| in Example IX) with 1.5 mil | 10.50 | 400-500 |
| thick coating of polypropylene | | |
| extruded at 380° F. | | |

NOTE: Except for the 10 mil thick nylon film, only intermittent contact was attained between the "old" film and newly made film. More uniform contact would undoubtedly give even higher peel strengths. The poor contact is believed to be due to shrinkage of the thin film upon contacting the hot newly made film. This problem can be overcome by equipment refinements to more quickly and efficiently chill the laminated films, such as by chilling the roller over which the film is passed.

As the foregoing examples show, by electric discharge corona treatment of sufficient intensity polyolefin films can readily be laminated even to olefinic nitrile and nylon films to form laminated sheets without the need of adhesives or intermediate adhesion films.

In addition, tests of polyethylene bonded to aluminum foil by treatment in accordance with the invention resulted in bonding strengths which exceeded the strength of the polyethylene film, i.e., attempts to separate the bonded films resulted in tearing of the film. Treatment in accordance with the invention provided strong polyolefin — aluminum foil bonding even when the aluminum foil contained residual lubricant oil on its surface.

On the pilot plant equipment intensity levels of treatment great enough to exceed the upper limit of the good adhesion range for the films tested could not be reached, because running the film at low enough speeds and/or increasing the power in part enough to increase the intensity of treatment above desired levels could not be readily accomplished, as it was on the bench scale equipment, due to equipment limitations.

The effect of temperature during or immediately after treatment of the film is that the higher the temperature, the greater is the surface effect attained by a given intensity of electric corona discharge treatment. For example, treatment of BAREX film at 20° C, with a given intensity of electric corona discharge treatment results in a contact angle with distilled water of 50°. Identical intensity of treatment of BAREX film at 65° C results in a contact angle with water of 39°.

Figure 4:
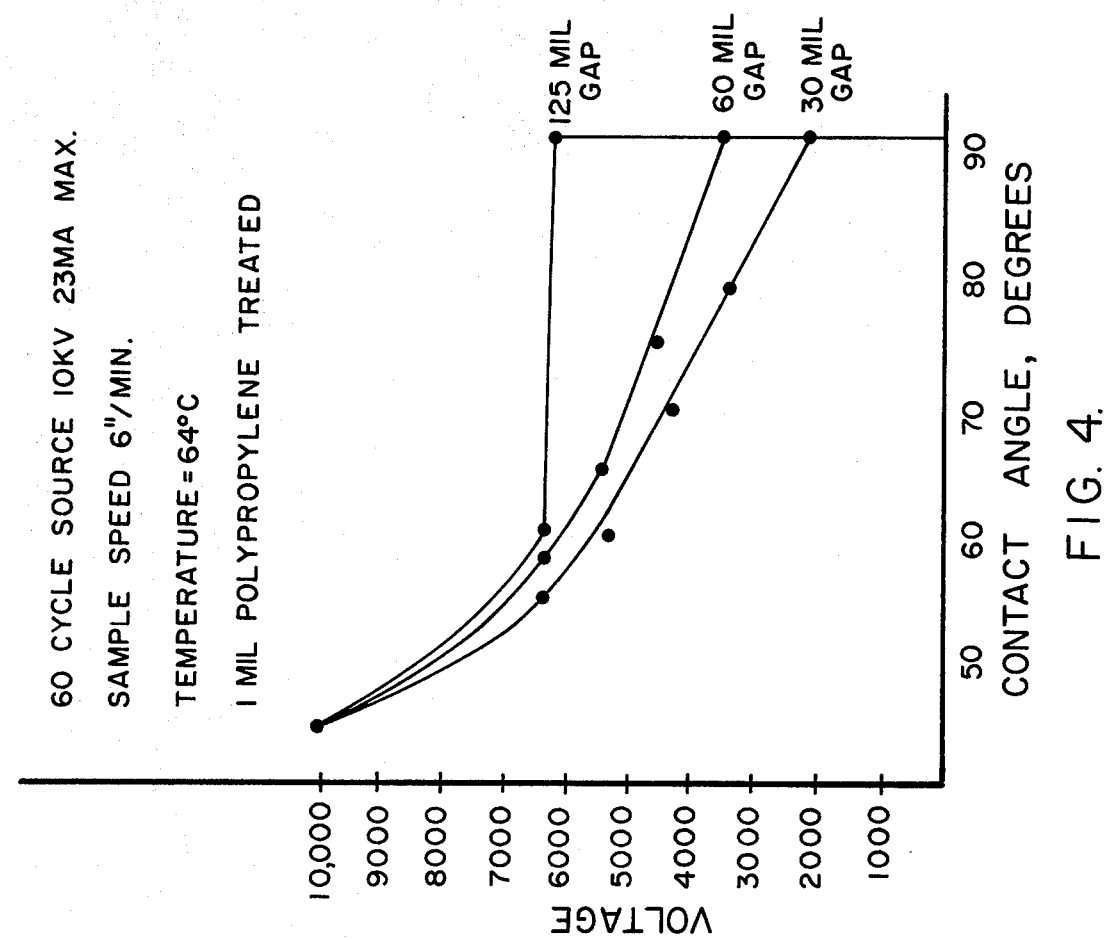
FIG. 4 is a graph plotting the voltage at onset of visible corona discharge against the contact angle attained for various gap settings of the electrode.
Figure 3:
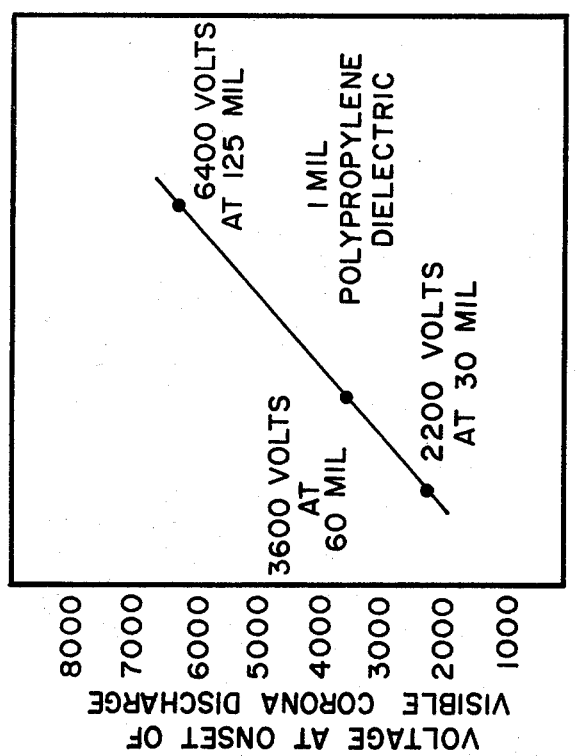
FIG. 3 is a graph plotting the voltage at onset of visible corona discharge against the electrode gap in mils for a one-mil thick polypropylene film.

As would be expected, the intensity of electric treatment is determined by the wattage input into the electrode pair, the speed of film travel relative to the electrode (which of course determines the residence time of the film within the corona discharge), the thickness of the film, and the gap between the electrode and the film. In FIG. 3, the voltage across the electrodes is shown at the onset of visible corona discharge in air, plotted against the electrode gap measured in mils, for one mil polypropylene film. FIG. 4 is a plot of voltage versus contact angle with water in degrees at various gap settings for the electrode for one mil polypropylene treated with electrodes connected to a 60 cycle, 10 kilovolt source, at a film speed past the electrodes of 6 inches per minute at 64° C.

The foregoing data was obtained in laboratory bench work and pilot plant test runs and well illustrates both the great bonding strength attainable, even for difficultly bondable dissimilar films, and the criticality of the range of intensity of treatment for bonding strength. However, as above described, when it was attempted to duplicate the results, or at least to obtain sufficiently strong bonding on a commercial production unit, difficulties were encountered. Primarily, bonding was weak, probably because the speed of film travel did not permit sufficient residence of the film in the corona discharge.

Figure 5:
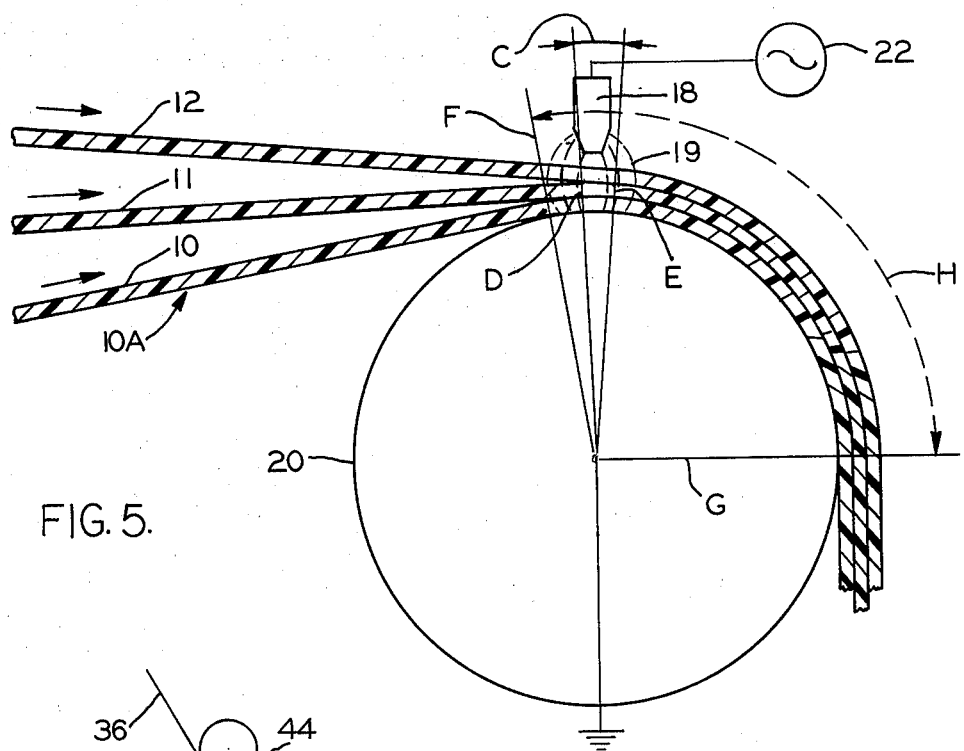
FIG. 5 is a schematic view in elevation showing three films being simultaneously treated by electric corona discharge treatment in accordance with the invention.

This difficulty was overcome by applying the corona discharge treatment simultaneously to the films and continuously through the critical region until the films were brought into contact as shown in FIG. 5. In FIG. 5, three films 10, 11 and 12 are shown being subjected to simultaneous corona discharge treatment in accordance with the invention by being drawn over a grounded roller 20 and subjected to a corona discharge between grounded roller 20 and electrode 18, which is connected to an alternator high voltage source 22. Film travel is in the direction shown by the solid line arrows. The contact film layer 10 has a lower surface 10A which physically contacts roller 20.

The corona discharge is illustrated by the dotted lines 19. The corona discharge does not extend beyond (to the left as viewed in FIG. 5) line F, the point where the lowermost surface 10A of film 10 first contacts roller 20. This is a preferred mode of operation since it precludes sticking of film 10 to roller 20. However, the critical region requirement is satisfied if corona discharge 19 is continuous from a point along line D where the film surfaces to be bonded to each other are spaced one from the other along an area indicated by arc C to a point along line E, at or beyond which the film surfaces are in physical contact with one another.

If corona discharge treatment extends beyond the critical region towards the right (as viewed in FIG. 5) of critical region C, it presents no difficulty so long as it does not extend beyond the region of contact of the film with the roller 20, this region being indicated by the arc H.

By maintaining the corona discharge continuously throughout the critical region defined above, as opposed to treating the film with electric corona discharge, discontinuing the corona treatment, however briefly, and then bringing the film together, enhanced effectiveness of treatment is attained. This is believed to be due to the salubrious effect of continuous bombardment with an electrons being maintained by the corona discharge until the films are in physical contact. As hereinabove noted, the pressure of the contact required is very slight, and pressure sufficient to draw the films together over the roller is more than ample to attain the desired result.

Figure 6:
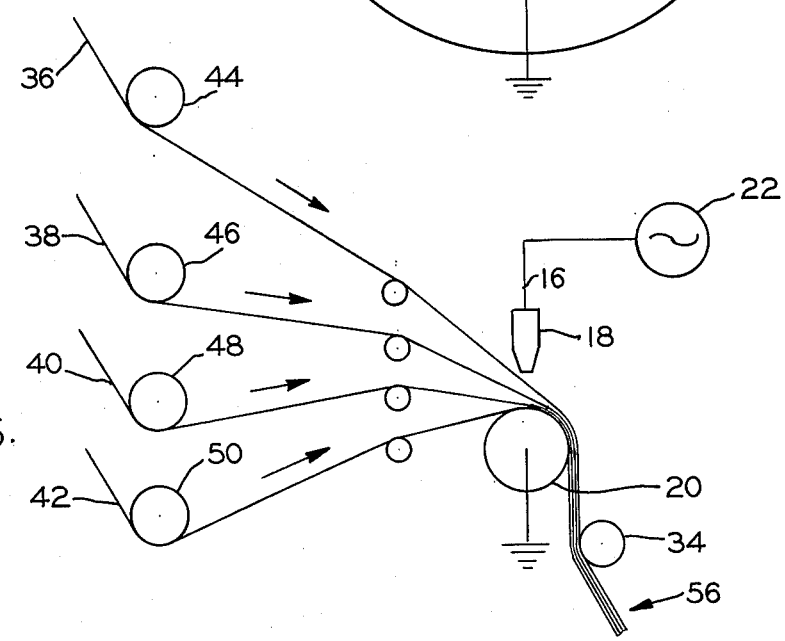
FIG. 6 is a schematic view in elevation somewhat similar to FIG. 5, but on a smaller scale, showing simultaneous treatment of four films.

FIG. 6 shows simultaneous treatment of four films 36, 38, 40 and 42, passing over their respective guide rollers 44, 46, 48 and 50 in the direction shown by the arrows. The four layers of film are passed through a corona discharge formed between electrode 18 and grounded roller 20, and the treated films are then passed over a roller 34 to take-up rolls (not shown) to form a laminated plastic sheet 56. In any of the embodiments shown, the grounded roller may be coated with a dielectric or, if the films being treated are thick enough to provide sufficient dielectric to obtain the corona discharge, the roller surfaces may be made of metal or other conductor.

Figure 7:
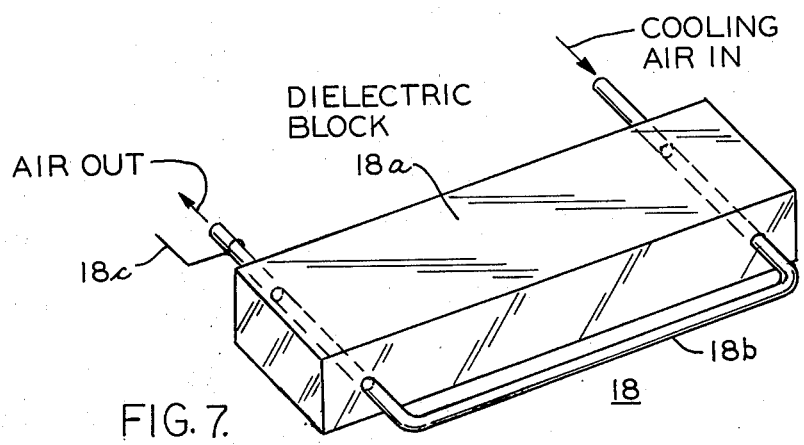
FIG. 7 is a schematic perspective view of an electrode useable in accordance with the invention.

A preferred form of electrode 18 is shown in FIG. 7. A dielectric block 18a has a chrome plated, hollow steel tube 18b formed generally into a U-shape mounted thereon by passing the legs of the U through the dielectric block. Lead 18c connects tube 18b to the power source 22, not shown in FIG. 7. Cooling air is blown through the tube 18b to prevent its over-heating.

In general, laminated sheets in accordance with the invention may be made by treating newly made films before they have cooled to substantially below their softening temperature. One or more of the films to be treated may be freshly made and one or more may be an "old", i.e., previously made, and cooled film supplied from a roll. As a third alternative, two or more "old" films may be treated and bonded together to form the laminated sheet. In such case, it may be desirable to heat such films to their softening temperature. The films may of course be made by any process, extrusion, casting, blowing, etc.

Figure 8:
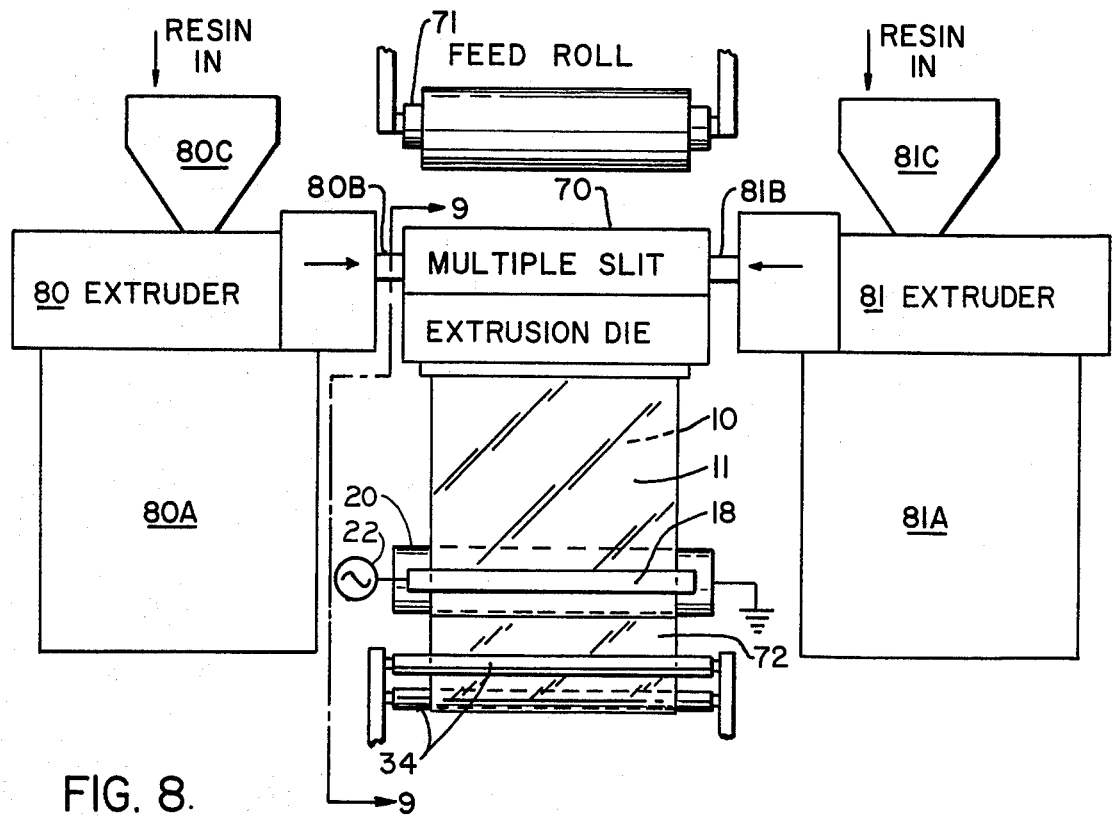
FIG. 8 is a schematic view in elevation showing treatment in accordance with the invention of two films freshly extruded from a multiple slit die fed by extruders.

Referring now to FIG. 8, apparatus for the manufacture of a laminated sheet in accordance with the invention is schematically illustrated. A multiple slit extrusion die 70 is supplied from opposite sides by, respectively, extruders 80 and 81 which are mounted, respectively, on supports 80A and 81A. Hoppers 80C and 81C receive resins fed to the extruders. The die 70 is fed, respectively, by extruder heads 80B and 81B in the directions shown by the arrows.

One or more feed rolls 71 are provided to supply premade film when such is being used. Feed roll 71 is shown not in use in FIG. 8. An electrode 18 is supplied from an alternating current source 22, and a grounded roller 20 is employed adjacent the electrode 18. Roller 20 may be chilled. Take-up rolls 34 serve to take up the composite sheet produced and feed it to a storage roll (not shown).

Figure 9:
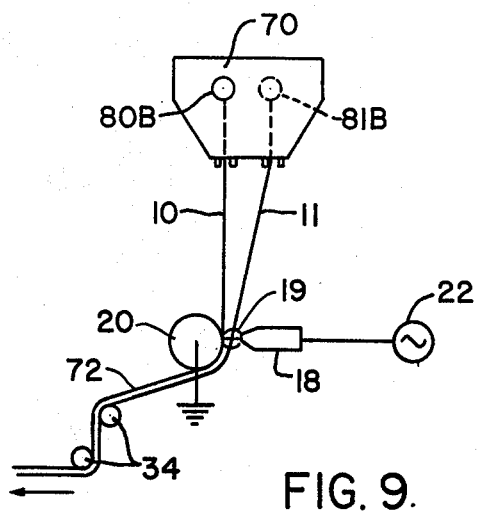
FIG. 9 is a view taken along line 9—9 of FIG. 8.

Referring jointly to FIGS. 8 and 9, two dissimilar films 10 and 11 are freshly made by extruding the appropriate resins, through, respectively, extruder 80 and extruder head 80B, and extruder 81 and extruder head 81B, into extrusion die 70. As best seen in FIG. 9, the two dissimilar films 10 and 11 are concurrently extruded from respective slits in die 70 and passed through the electric discharge corona 19 in accordance with the teachings of the invention.

The tension imposed on the films by the take-up rolls 34 provide the necessary bonding force between them, and the laminated film 72 formed thereby is taken by rollers 34 to a storage take-up roll, not shown. Roller 20 may be chilled to help cool the laminated film.

Figure 10:
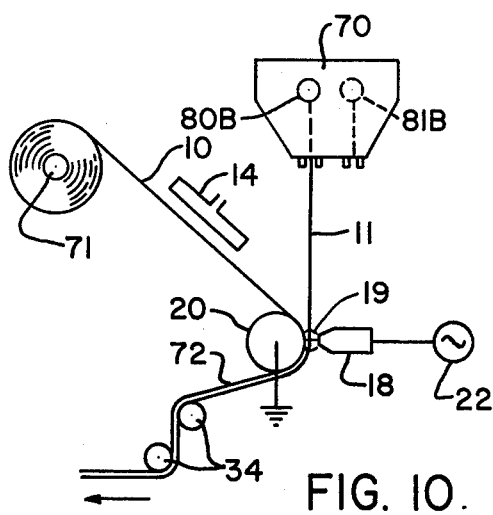
FIG. 10 is a view corresponding to that of FIG. 9 but showing simultaneous treatment of one film freshly extruded from the multiple slit die with a previously made film fed from a roll.

Referring now to FIG. 10, the apparatus of FIG. 8 is shown being employed to laminate a freshly extruded film 11 with, in this case, a previously manufactured film 10 taken from feed roll 71. The previously made film 10 is supplied from feed roll 71 and passes under a heater 14 of any convenient type which is used to heat the film to near its softening temperature. Newly made film 11 is extruded from die 70 and the two films are passed together between electrode 18 and grounded roller 20 and simultaneously subjected to corona discharge 19 in accordance with the invention. The laminated composite sheet 72 is taken up by take-up rolls 34 as before. In all cases the direction of film travel is shown by the arrows.

Figure 12:
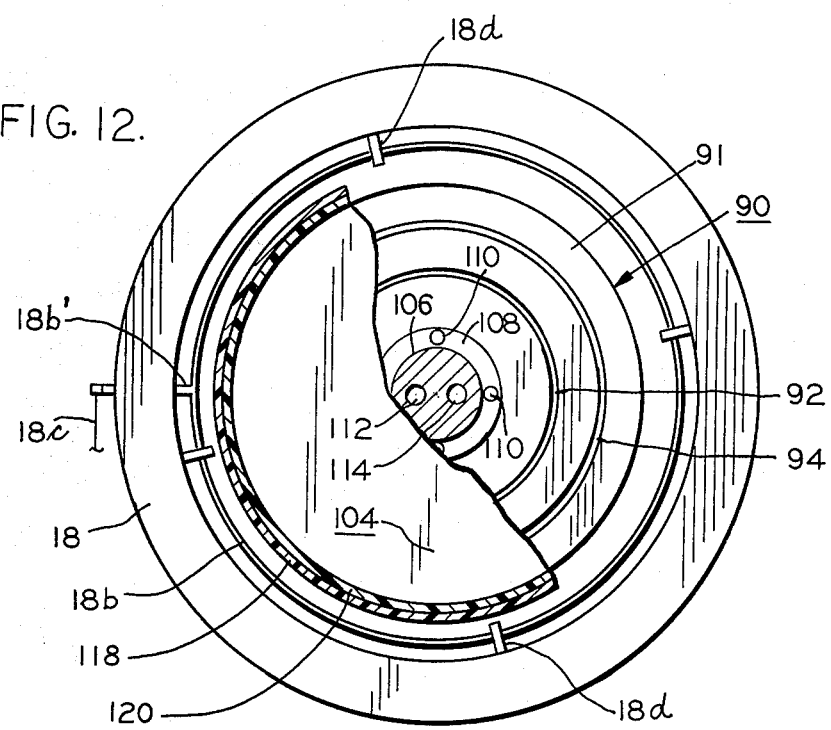
Figure 11:
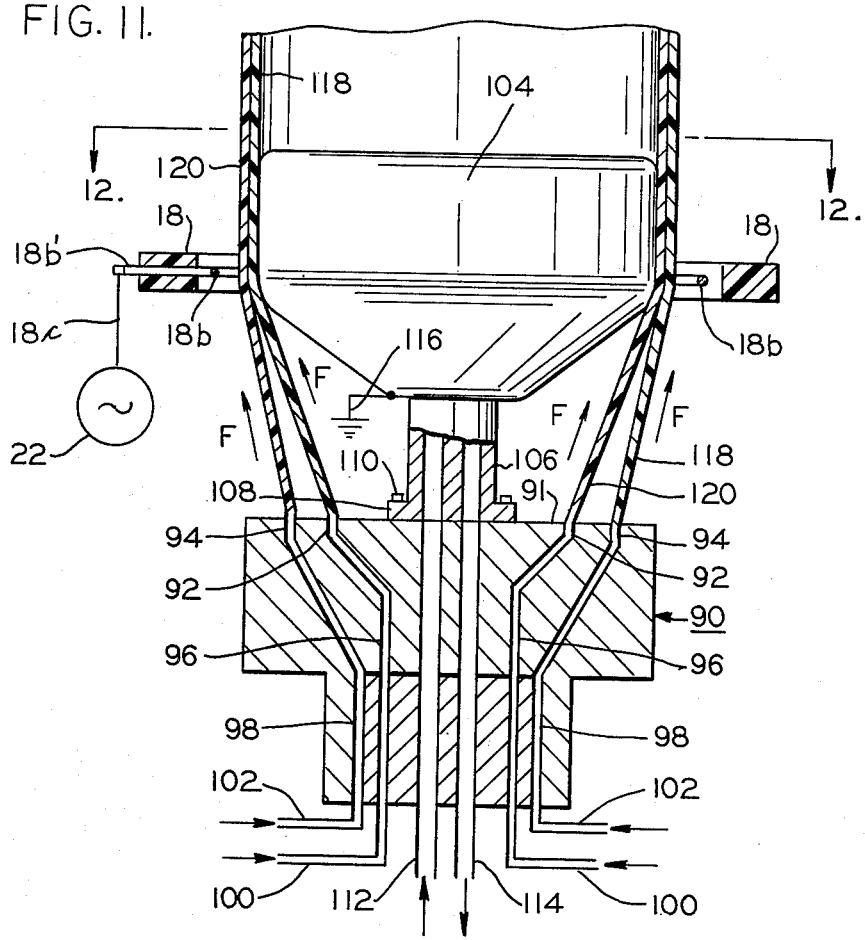
FIG. 11 is a partially broken-away schematic view in elevation showing two tubular laminated films being simultaneously treated by electric corona discharge treatment in accordance with the invention; and, FIG. 12 is a view taken along lines 12—12 of FIG. 11, with parts broken away.

Referring now to FIGS. 11 and 12, a tubular film extrusion die 90 has formed therein a circular inner extrusion slit 92 and a circular outer extrusion slit 94, as may best be seen in FIG. 12. Extrusion slits 92 and 94 are in flow communication with melt channels 96 and 98 (FIG. 12), respectively, which are annularly disposed relative one another and substantially circular in cross section within extrusion die 90. Melt channels 96 and 98 are led, respectively, from resin feed inlets 100 and 102.

A cooling mandrel 104 is supported above the horizontal surface 91 of extrusion die 90 by means of support post 106. Support post 106 has a collar portion 108 through which bolts 110 are passed to affix post 106 to die 90.

A cooling water inlet 112 and a cooling water outlet 114 pass through die 90 and post 106 and into cooling mandrel 104. Inlet 112 and outlet 114 are suitably connected in flow communication within mandrel 104 (connections not shown) so as to permit the circulation of cooling water into and out of mandrel 104 in the known manner.

A ring electrode 18b completely encircles cooling mandrel 104 a short distance from the periphery thereof. Ring electrode 18b is supported on a doughnut-shaped dielectric block 18 by dielectric ring supports 18d positioned at spaced locations about the periphery of blocks 18. Electrode 18b is connected to a source 22 of alternating current high voltage electricity via connection 18c made with a leg 18b' of ring electrode 18b.

Electrode 18b may be made hollow and provided with a one or more cooling air outlets (not shown) in order to blow cooling air through electrode 18b to avoid overheating thereof.

Cooling mandrel 104 is grounded by a suitable ground connection indicated schematically at 116.

Referring to FIG. 11, in operation, a first resin is introduced into resin feed inlet 100 and a second resin is introduced into a resin feed inlet 102 as indicated by the unmarked arrows in FIG. 11. The resins are introduced under pressure in the known manner, and two incompatible films 118 and 120 are extruded in the form of tubes, in the direction shown by arrows "F". (For clarity, films 118, 120 are not shown in FIG. 12) Cooling water is introduced into cooling water inlet 112, circulates within cooling mandrel 104 to cool films 118, 120 passing thereover, and the heated cooling water is withdrawn via cooling water outlet 114. The films accordingly are cooled in their travel over the outer peripheral surface of cooling mandrel 104.

A corona discharge is maintained between ring electrode 18b and the adjacent portion of cooling mandrel 104. In accordance with the invention, the corona discharge is maintained throughout the critical region from a point prior to the point where newly formed films 118 and 120 come into contact at least to the point where the two films are joined in surface-to-surface contact.

The extrusion or blowing of films in the forms of tubes, and the forming of concentric tubes of film to form a laminated tube is known in the art. See, for example, U.S. Pat. No. 3,184,358. Similarly, the use of a cooling mandrel in the formation of such tubes is also known in the art. See, for example, U.S. Pat. No. 2,720,680. The embodiment of FIGS. 11 and 12 show the application of the present invention to such tubular, mandrel cooled processes.

The invention has been described in detail with respect to specific embodiments thereof. It will be apparent that upon a reading and understanding of the above, alterations and modifications may be made thereto, which alterations and modifications are within the scope and spirit of the present invention. For example, while the examples given above are for films treated in ambient room atmosphere, treatment may be carried out in an oxygen-rich atmosphere, a rare gas or nitrogen atmosphere, or any atmosphere selected to meet the particular ends desired.

For another example, it may not be necessary to treat all the individual films when three or more films are to be joined. If films A, B and C are to be laminated together, and film A is compatible with film B, but film B is incompatible with film C, treatment only of films B and C in accordance with the invention is required. Obviously, all three films may be treated simultaneously and it usually is much more convenient to do so.

It is intended to include all such alterations and modifications within the scope of the appended claims or the equivalents thereof.

What is claimed is:

1. A method of laminating two or more sheets together comprising the steps of
   (a) introducing a plastic sheet into a visible alternating current corona discharge in air so that at least one surface of said plastic sheet is exposed to said corona discharge sufficiently to effect a change in the hydrophilic characteristics of said surface,
   (b) introducing a second sheet, which is chemically dissimilar to said plastic sheet into said visible alternating current electrical corona discharge in air so that at least one surface of said second sheet is exposed to said discharge sufficient to effect a change in the hydrophilic characteristics of said surface, (c) contacting the treated surfaces of said sheets with each other while said surfaces are still within said visible alternating current corona discharge to bond said sheets together, and (d) withdrawing the bonded sheets from the said mentioned visible alternating current corona discharge.

2. The method of claim 1 including heating said plastic sheet sufficiently so that upon contact with said second sheet, the changed surface of the plastic sheet is in a softened condition.

3. A method of bonding at least two chemically dissimilar sheets one to the other to form a laminate without an adhesive material interposed therebetween, at least one of said sheets being a plastic sheet, said sheets having surfaces to be bonded to each other and comprising materials whose bonding compatibility to each other is enhanced by electrical corona discharge treatment of at least one of said sheet surfaces, said method comprising (a) introducing said sheets in air into a visible alternating current corona discharge zone between a pair of electrode members one of which is a grounded film support member with said sheet surfaces spaced one from the other, (b) contacting the sheet surfaces to each other within said corona discharge zone and (c) maintaining the visible alternating current corona discharge in the wedge shaped divergence defined between the surfaces of adjacent sheets extending from the line of contact in the direction opposite to the direction of movement of the sheets to where the sheets are spaced apart.

4. The method of claim 3 wherein said at least one plastic sheet is heated sufficiently so that said surface thereof is softened prior to step (c).

5. The method of claim 4 wherein said at least one surface of said plastic sheet is heated to a temperature between the softening point and melting point of the plastic.

6. The method of claim 4 wherein said at least one plastic sheet is a freshly made sheet at an elevated temperature from its manufacturing process.

7. The method of claim 3 wherein one of said sheets is formed of a polyolefin, and another of said sheets is formed of a material selected from the class consisting of olefinic nitrile polymer and copolymers, polyamides and polyesters.

8. The method of claim 3 wherein one of said sheets is a platic sheet plastic another of said sheets is a metal foil.

9. The method of claim 3 further including introducing continuous webs of said sheets into said visible alternating current corona discharge, supporting at least one of said webs on said support member and forming said visible alternating current corona discharge between said support member and an extended electrode positioned with its longitudinal axis extending adjacent to said continuous webs and on the opposite side thereof from said support member.

10. Apparatus for laminating at least two chemically dissimilar sheets one to the other to form a laminate comprising (a) electrical conducting means for supporting said sheets along a path of travel, an electrode positioned adjacent said support means on the opposite side of said path of travel forming a visible electrical corona discharge zone in air between said electrode and said support means, (b) means for generating a visible alternating current corona discharge between said electrode and said support means, (c) means for transporting a plurality of sheets between said electrode and said support means whereat a visible electrical corona discharge is established between said sheets, and (d) means for bringing said sheets into contact with each other within said corona discharge zone.

* * * * *

UNITED STATES PATENT AND TRADEMARK OFFICE
CERTIFICATE OF CORRECTION

PATENT NO. : 4,096,013
DATED : June 20, 1978
INVENTOR(S) : Paul D. Frayer and H. Harald Lutzmann It is certified that error appears in the above–identified patent and that said Letters Patent are hereby corrected as shown below:

Column 18, line 12, change "platic" to --plastic--.

Column 18, line 12, replace "plastic" with --and--.

Signed and Sealed this

Thirtieth Day of January 1979

[SEAL]

Attest:

RUTH C. MASON
Attesting Officer

DONALD W. BANNER
Commissioner of Patents and Trademarks